(No Model.)
C. HÄFNER.
APPARATUS FOR TREATING BEER.
No. 425,421. Patented Apr. 15, 1890.
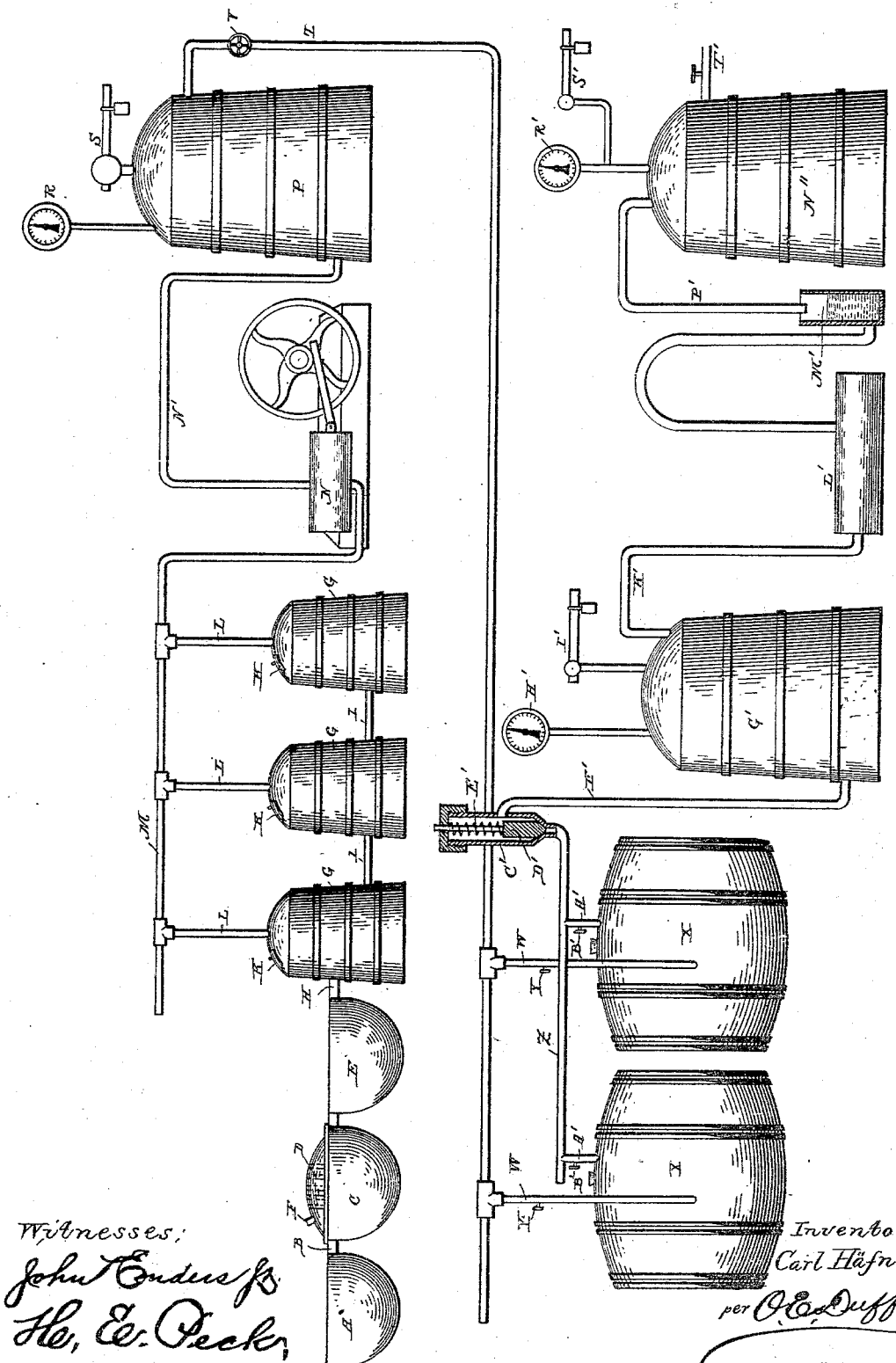
Witnesses:
John Enders Jr.
H. E. Peck
Inventor:
Carl Häfner
per O. E. Duffy
Attorney.

UNITED STATES PATENT OFFICE.

CARL HÄFNER, OF CHICAGO, (LAKE VIEW,) ILLINOIS.

APPARATUS FOR TREATING BEER.

SPECIFICATION forming part of Letters Patent No. 425,421, dated April 15, 1890.

Application filed March 11, 1889. Serial No. 302,755. (No model.)

*To all whom it may concern:*

Be it known that I, CARL HÄFNER, of Chicago, (Lake View,) in the county of Cook and State of Illinois, have invented certain new and useful Improvements in Apparatus for Treating Beer; and I do hereby declare that the following is a full, clear, and exact description of the invention, which will enable others skilled in the art to which it appertains to make and use the same, reference being had to the accompanying drawing, and to the letters of reference marked thereon, which forms part of this specification.

This invention relates to certain improvements in the manufacture of beer; and it has for its objects to collect the carbonic-acid gas resulting from the fermentation of the mash and the volatile essence of the hops for subsequent utilization and to refine the beer while in the "krausen" stage quickly and expeditiously.

Heretofore in the process of brewing the carbonic-acid gas given off by the initial fermentation of the mash, as well as a portion of the volatile or essential elements of the hops, are generally allowed to escape and go to waste, entailing an unnecessary loss, which is prevented by my invention, while by my invention the aging and ripening of the green or krausen beer is thoroughly and rapidly effected.

The accompanying drawing is a diagram showing the various parts of a system of apparatus in elevation, whereby my invention is practiced.

Referring to the drawing, the letter A indicates a mash-tun of the ordinary construction, containing the mash or malt extract, which is kept at a temperature of 150° Fahrenheit or thereabout, as usual. From the said tun leads a pipe B to a closed boiler C, in which the mash-malt extract or wort is mixed and combined with the hops or extract thereof, the said boiler being provided with the usual stirrer D, by means of which the contents may be agitated to effect a thorough mixture of the same. From the upper part of said boiler extends a pipe F, which leads to a suitable condenser in which the volatile or essential elements of the hops, which have hitherto been allowed to escape, condense.

The letter E indicates a cooler of the ordinary construction, into which the wort from the boiler C passes previously to entering the fermenting tun or tuns. Any number of these may be employed, three being represented in the present instance and indicated by the letter G. These are connected with the cooler by means of a pipe H, having branches I leading to the said tuns. The tuns are closed at the top, and the tops are provided with suitable man-holes K, with the usual removable covers, whereby access may be had to the interior for cleaning and other purposes.

From the upper part or top of each tun G extends a pipe L, which connects with a common pipe M, leading to the exhaust-pump N, which is operated by an engine or other motor, the eduction-port of said pump having extending from it a pipe N', leading to a gas-tight vessel or reservoir P, which is provided with a pressure-gage R and safety-valve S. From the reservoir P extends a pipe T, which is provided with a cock-valve V, for the purposes hereinafter explained. The said pipe at suitable intervals is provided with branch pipes W, which may be connected with one or more casks or hogsheads X, containing beer or other fermented liquor. The branch pipes W are provided with suitable cocks or valves Y, by means of which communication between the pipe T and the casks or hogsheads may be established or cut off when necessary.

The letter Z indicates a pipe, which is also provided with branch pipes A', which may be connected with the casks or hogsheads, as shown, and which are provided with stop-cocks B' to establish or close connection between the casks or hogsheads and the said pipe Z. At one end of the pipe Z is located a valve-chamber C', in which is located a regulating-valve D', which is held normally to its seat, by means of a spring E', at such pressure as to give way when the pressure in the casks exceeds a proper limit, thus serving as a safety-valve, and as a means of securing a uniform pressure in the casks. From the valve-chamber C' extends a pipe F' to a gas-tight reservoir or receiving-tank G', which is provided with a pressure-gage H' and safety-valve I', and from said tank extends a pipe K′ to an exhaust and compressing-pump L′, the eduction-port of which connects with a purifying-chamber M′, which in turn is connected with a gas-tight tank N″ by means of a pipe P′, the tank having a pressure-gage R′ and safety-valve S′, and also an eduction-pipe T′, provided with a suitable stop-cock or valve, for the purpose hereinafter explained.

The operation of my invention will be readily understood in connection with the above description, and is as follows: The heated wort passes from the mash tun or tub A into the boiler C, where it has combined with it the hop extract, in the usual manner, the volatile essential or aromatic portions, which usually escape, being carried to a condenser through the pipe F. The wort is then passed to the cooler E, and from thence to the fermenting-tuns G, where the fermentation takes place in the usual manner. The carbonic acid resulting from the fermentation is drawn off from the tuns as it is generated by the pump N and forced into the storage tank or reservoir P, where it is held for use as required. From thence the carbonic-acid gas is supplied to the casks or hogsheads X through the pipe T and branch pipes W, and when the pressure exceeds the proper limit the valve D′ is automatically raised, allowing the surplus gas to escape into the tank G, and from thence it is drawn by the pump L′, and passed through the purifier into the tank N″, wherein it may be compressed until liquefied for use in ice-machines, for charging soda-fountains, and for other purposes to which liquefied carbonic-acid gas is applied.

It will be seen that by my invention the carbonic-acid gas which is usually wasted is utilized to fine the beer when in the green or krausen stage, thus obviating the necessity of clarifying or refining the same by means of isinglass or gelatine, and rendering unnecessary the "bunging" operation employed in such refining process, which occupies time, is attended with waste, and gives rise to objectionable accumulations, which impair the quality of the beer. Moreover, by my improved system of brewing the time occupied in the process is materially shortened and a higher quality of beer is produced.

Having thus fully described my invention, what I claim, and desire to secure by Letters Patent, is—

1. In an apparatus for treating beer with its own carbonic-acid gas, the combination of a closed initial fermenting-tank, a closed cask or vessel to receive the fermented beer, connections between said tank and said vessel, a pump interposed in said connections between the tank and vessel to draw the carbonic-acid gas of fermentation from the tank and force the same into the cask or vessel, thereby treating the fermented beer therein with said gas, provided with an automatic regulator, and an exit from said cask or vessel for the surplus gas, substantially as described.

2. The combination with a closed fermenting-tun wherein initial fermentation of the mash takes place, a vacuum-pump connected with and adapted to draw the gas from said tun, a supply-reservoir connected with said pump, into which said pump forces and compresses the gas, a cask or vessel adapted to contain fermented beer, a pipe or pipes connecting said tank and said cask, whereby said gas is forced into the cask under pressure and another tank connected with said cask and adapted to receive the surplus gas from the same, substantially as described.

3. In an apparatus for treating beer with its own carbonic-acid gas, the combination of a cask to receive fermented beer, a pipe supplying carbonic-acid gas under pressure from the fermenting mash, an exit-pipe from said cask, an automatically-operating regulating-valve in the same, and a storing-reservoir into which said pipe opens, whereby when the pressure of the gas in the cask exceeds a certain amount the valve is operated and the surplus gas flows into said reservoir, substantially as described.

4. The combination of a cask, wherein the fermented beer is subjected to treatment with carbonic-acid gas under pressure, a storage-tank for the surplus gas from said cask, a pipe connecting the cask and tank and provided with a compressing automatically-operating regulator, and a compressing-pump to draw the gas from said storage-tank and force the said gas into and compress and liquefy the same in said compressing-tank, substantially as described.

In testimony that I claim the foregoing as my own I affix my signature in presence of two witnesses.

CARL HÄFNER.

Witnesses:
C. A. WILLIAMS,
M. H. PARKINSON.